Dec. 15, 1959   J. T. VANTA   2,917,330
AUXILIARY SEAL
Filed June 20, 1957
FIG. 1.
FIG. 2.
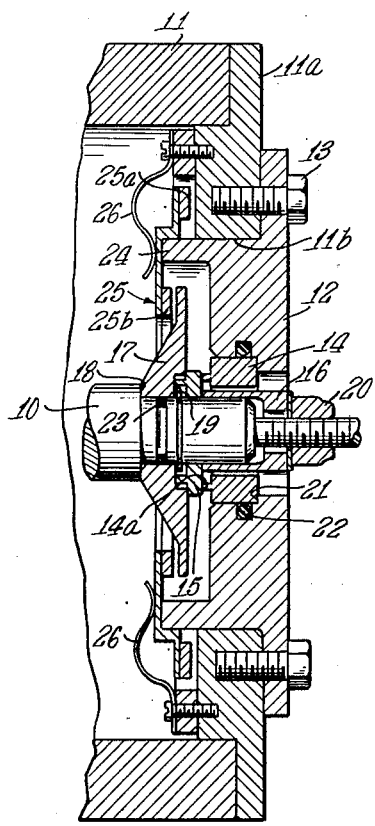
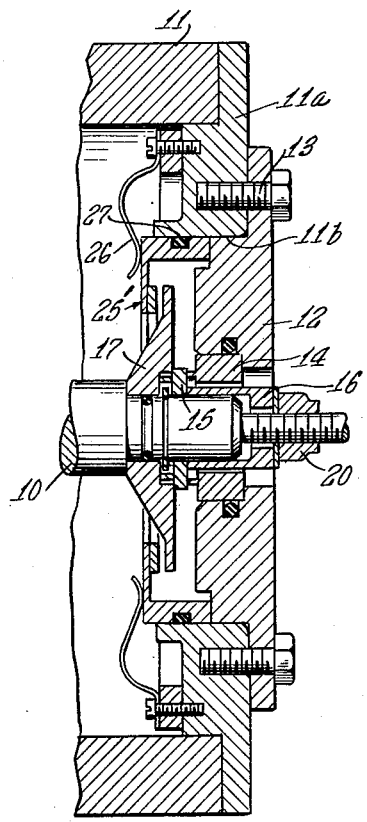
INVENTOR.
John T. Vanta
BY
ATTORNEYS

United States Patent Office 2,917,330
Patented Dec. 15, 1959

2,917,330
AUXILIARY SEAL

John T. Vanta, Bayside, N.Y., assignor to Fairchild Engine and Airplane Corporation, Hagerstown, Md., a corporation of Maryland Application June 20, 1957, Serial No. 666,832

9 Claims. (Cl. 286—11.13)

This invention relates to an auxiliary seal for a shaft which operates within and passes through a sealed housing and, more particularly, to an auxiliary seal of that type which is in a retracted, inoperative position during the regular operation of the shaft but is movable into operative position to produce an effective seal between the shaft and the housing when it is desired to remove or replace the primary seal or a bearing for the shaft.

In certain machines, such as pumps or compressors, the removal or replacement of the primary seal for a shaft which operates within or passes through a sealed housing containing a fluid is a time-consuming procedure. For example, it is ordinarily necessary to disconnect the machine entirely from the fluid system and to evacuate the fluid from the housing. The auxiliary seal of the present invention, however, permits the removal or replacement of the primary seal without requiring that the machine be disconnected from the fluid system or that the fluid be evacuated from the housing.

The auxiliary seal of the present invention comprises an annular seal element which surrounds the shaft and is urged into sealing engagement with a surface carried by the shaft to establish an effective seal between the outer periphery of the shaft and the housing. The auxiliary seal, however, is held out of engagement with this surface by a detachable member which serves as a retainer for the primary seal, so that the auxiliary seal will not interfere with the rotation of the shaft. But when the seal retaining member is removed to permit inspection or replacement of the primary seal, which, of course, would be done ordinarily only when the shaft is at rest, the auxiliary seal is urged into sealing engagement with the shaft, thereby maintaining the housing sealed until the seal retaining member is replaced.

For a complete understanding of the present invention, reference may be made to the detailed description which follows and to the accompanying drawings in which:

Figure 1 is a cross-sectional view of a sealed housing equipped with the auxiliary seal of the present invention; and Figure 2 is a cross-sectional view illustrating another embodiment of the invention.

Referring to Figure 1 of the drawings, a shaft 10 is rotatably mounted within a sealed housing 11. One end of the shaft 10 extends through the end wall 11a of the housing, such as, for example, to permit the shaft to be connected to a drive motor (not shown). The wall 11a is provided with a large opening defined by the edge 11b through which the shaft passes. A seal retaining member 12 is accommodated within and overlies this circular opening, and the overlying portion of the member 12 is affixed to the end wall 11a by bolts 13. The seal retaining member 12 is annular in shape, and its chief purpose is to retain a primary seal 14 in place. In the specific form shown, the primary seal is a carbon seal which surrounds both the rotating shaft 10 and a sleeve 16 carried by the shaft. One end of the seal 14 is formed with a portion 14a of reduced thickness, and this end is in sealing contact with a radial surface of a sealing collar 15 adjacent the sleeve 16.

A disk 17 is mounted on the shaft inside the seal retaining ring 12 and adjacent the collar 15. The disk 17 is held against axial movement on the shaft on one side by a shoulder 18 formed on the shaft by a change in the diameter thereof, and on the other side by a snap ring 19 on the shaft. The collar 15 and the sleeve 16 are retained in position on the shaft with one side of the collar 15 in sealing engagement with the disk 17 by a retaining nut 20 threaded onto the shaft.

The carbon seal 14 seats in a recessed portion of the annular retaining ring 12. The shoulder 21 of the retaining ring maintains the opposite end 14a of the carbon seal in contact with the collar seal 15. An O-ring 22 accommodated within a groove of the retaining member 12 provides an effective seal between the inner periphery of the retaining member and the outer periphery of the carbon seal. Also, the engagement between the end 14a of the carbon seal and the collar 15 provides an effective seal between the outer periphery of the sleeve 16 and the inner periphery of the carbon seal. Although the disk 17 is snugly fitted on the shaft 10, an O-ring 23 between the inner periphery of the disk and the outer periphery of the shaft helps to prevent leakage of the fluid therebetween.

The inner face of the annular retaining ring 12 is provided with an annular extension or abutment 24 which serves as a support for an auxiliary seal 25. When the annular ring 12 is mounted in the position illustrated in the drawing, the outer periphery 25a of the auxiliary seal is laterally offset from the inner wall 11a of the housing, and the inner periphery 25b is laterally offset from one face of the disk 17. The auxiliary seal 25, of course, surrounds the entire shaft and is continuous, so that when permitted to engage the surfaces of the housing and disk, an effective seal therebetween is produced. A plurality of leaf-type springs 26 maintain the auxiliary seal 25 against the abutment 24. Therefore, when the retaining ring 12 is removed, the leaf springs 26 urge the auxiliary seal laterally into engagement with the surfaces of the end wall 11a of the housing and the disk 17, thus producing an effective seal therebetween which prevents escape of fluid from the housing.

In use, the auxiliary seal 25 is maintained in inoperative position by abutment with the detachable retaining ring 12. An effective seal for the housing is maintained by the primary seal 14 and the various supplemental seals described above. When it is desired to inspect the primary seal or to replace it, the annular retaining ring 12 is detached from the housing by the removal of the bolts 13. The removal of this retaining ring provides ready access to the primary seal 14. Upon removal of the retaining ring 12, however, as explained above, the auxiliary seal 25 moves into operative position, establishing a seal between the housing and the shaft, and permitting inspection or removal of the primary seal 14 without loss of the fluid enclosed within the sealed housing. When the primary seal 14 is replaced and the retaining ring 12 restored to position, the auxiliary seal 25 is moved out of operative position by the abutment 24 so that it will not interfere with the rotation of the shaft.

Another embodiment of the invention is illustrated in Figure 2 of the drawings. In this embodiment the auxiliary seal 25' is in constant sealing engagement with the edge 11b which forms the inner periphery of the wall 11a of the housing. An O-ring 27 accommodated within a groove in the outer periphery of the auxiliary seal 25' helps to establish an effective seal between the auxiliary seal and the end wall 11a of the housing. The auxiliary seal 25', however, is capable of sliding movement relative to the end wall 11a. When the retaining ring 12 is in place, as shown in Figure 2, the auxiliary seal 25' abuts against the inner side of the ring, and in this position of the seal the inner periphery thereof is maintained laterally offset from the face of the disk 17 carried by the rotating shaft. However, when the retaining ring 12 is removed, the leaf springs 26 urge the auxiliary seal 25' to the right, as viewed in Figure 2, moving the inner periphery of the auxiliary seal into engagement with the face of the disk 17. This, as in the embodiment illustrated in Figure 1, maintains an effective seal for the housing while the annular ring 12 and the primary seal 14 are removed.

The invention has been shown in preferred forms and by way of example only, and obviously many variations and modifications may be made therein without departing from the spirit of the invention. The invention, therefore, is not to be limited to any specified form or embodiment, except in so far as such limitations are set forth in the claims.

I claim:

1. An auxiliary seal for a shaft which operates within a sealed housing comprising an auxiliary sealing element surrounding the shaft, a surface carried by the shaft with which said auxiliary sealing element is engageable, force exerting means urging the auxiliary sealing element into engagement with said surface in order to maintain an effective seal between the housing and the shaft, an opening in said housing for providing access to the shaft and a cover for said opening removably mounted to the housing which, when so mounted, displaces the auxiliary sealing element and holds it out of engagement with the surface carried by said shaft and, when removed, permits the force exerting means to move the auxiliary sealing element into sealing engagement with the surface carried by the shaft.

2. An auxiliary seal for a rotatable shaft which operates within a sealed housing comprising a movable auxiliary sealing element surrounding said shaft, a surface carried by said shaft with which the auxiliary sealing element is engageable to provide an effective seal between the housing and the shaft, resilient means urging the auxiliary sealing element into sealing engagement with said surface carried by the shaft, a primary sealing element for maintaining a seal between the housing and the shaft, and a retaining member for the primary sealing element, said retaining member being attached to the housing to maintain the primary sealing element in place, said retaining member when attached to the housing displacing said auxiliary sealing element out of sealing engagement with the surface carried by said shaft, but when detached from the housing permitting the resilient means to move the auxiliary sealing element into sealing engagement with said surface carried by the shaft.

3. An auxiliary seal as set forth in claim 2 including a guide surface independent of said retaining member for supporting the sealing element for movement in the direction of the axis of the shaft, whereby the outer periphery of the auxiliary sealing element is in sealing engagement with the housing whether the retaining member is in place or not.

4. An auxiliary seal as set forth in claim 2 including abutment means formed on the retaining member for the support of the auxiliary sealing element.

5. An auxiliary seal as set forth in claim 2 wherein the inner periphery of the auxiliary sealing element is engageable with the surface carried by said shaft and wherein the outer periphery thereof is engageable with a surface of the housing.

6. An auxiliary seal for a shaft which operates within a sealed housing comprising a movable auxiliary sealing element surrounding said shaft, a disk mounted on said shaft, spring means urging the auxiliary sealing element into engagement with said disk in order to maintain an effective seal between the housing and the shaft, a guiding surface for supporting the sealing element for movement in the direction of the axis of the shaft, a primary sealing element, and a retaining member attachable to said housing for maintaining the primary sealing element in sealing position, said retaining ring when attached to the housing maintaining the auxiliary sealing element out of contact with the disk, and said spring means urging the auxiliary sealing element into sealing contact with said disk when the retaining ring is detached from the housing.

7. A sealing device for a rotatable shaft which operates in a sealed housing comprising an opening in the housing for providing access to the shaft, means surrounding the shaft to form a seal, the outer portion of the sealing means being engageable with the housing surrounding the opening, a surface carried by the rotatable shaft with which the inner portion of the sealing means is engageable, whereby the sealing means in operative position prevents leakage through the opening in the housing, means exerting a force on the sealing means to urge the sealing means into sealing engagement with the surface carried by the shaft, and a cover for the opening in the housing which, when in place, moves the sealing means out of contact with the surface carried by the rotatable shaft.

8. A sealing device as set forth in claim 7 wherein the sealing means is an annular element and including a support for the sealing means, which support is formed integrally with the cover.

9. A sealing device as set forth in claim 7 including a guiding surface for supporting the sealing element for movement in the direction of the axis of the shaft.

References Cited in the file of this patent

UNITED STATES PATENTS

| 2,255,333 | Scheiwer | Sept. 9, 1941 |
| 2,612,391 | Boutros | Sept. 30, 1952 |
| 2,630,290 | Courtot | Mar. 3, 1953 |
| 2,643,141 | Bryant | June 23, 1953 |
| 2,850,298 | Clark | Sept. 2, 1958 |

FOREIGN PATENTS

| 616,802 | Great Britain | Jan. 27, 1949 |